United States Patent [19]

Randall

[11] Patent Number: 5,760,565
[45] Date of Patent: Jun. 2, 1998

[54] METHOD AND APPARATUS FOR REDUCING IRON LOSSES IN A SWITCHED RELUCTANCE MACHINE

[75] Inventor: Steven Paul Randall, Leeds, United Kingdom

[73] Assignee: Switched Reluctance Drives Limited, Harrogate, United Kingdom

[21] Appl. No.: 753,983

[22] Filed: Dec. 4, 1996

[30] Foreign Application Priority Data

Dec. 5, 1995 [GB] United Kingdom ............... 9524893

[51] Int. Cl.$^6$ ................................................ H02P 7/05
[52] U.S. Cl. ............................... 318/701; 318/254
[58] Field of Search .............................. 318/701, 720, 318/721, 722, 138, 254, 439, 685, 696

[56] References Cited

U.S. PATENT DOCUMENTS

| | | | |
|---|---|---|---|
| 4,500,824 | 2/1985 | Miller | 318/701 |
| 4,611,157 | 9/1986 | Miller et al. | 318/696 |
| 5,015,903 | 5/1991 | Hancock et al. | 318/138 X |
| 5,138,244 | 8/1992 | Bahn | 318/701 |
| 5,260,635 | 11/1993 | Bahn | 318/701 |
| 5,619,113 | 4/1997 | Bahn | 318/701 |

*Primary Examiner*—Bentsu Ro
*Attorney, Agent, or Firm*—Arnold, White & Durkee

[57] ABSTRACT

A method of controlling a switched reluctance machine having a rotor and a stator with at least one phase winding to reduce iron loss whereby the phase winding is energized over a first angular period of the rotation of the rotor and then current in the phase winding is allowed to freewheel through the phase winding for a second angular period of rotor rotation where, in a first method, the second angular period is greater than the first angular period. Also a method of using freewheeling in high speed applications to reduce iron loss.

24 Claims, 6 Drawing Sheets

METHOD AND APPARATUS FOR REDUCING IRON LOSSES IN A SWITCHED RELUCTANCE MACHINE

FIELD OF THE INVENTION

This invention relates to reluctance machine systems and more particularly to systems utilizing switched reluctance machines. In particular, the present invention relates to a method and apparatus for reducing iron losses in switched reluctance machine systems.

BACKGROUND OF THE INVENTION

In general, a reluctance machine is an electric machine in which torque is produced by the tendency of its movable part to move into a position where the inductance of an excited winding is maximized.

In one type of reluctance machine the energization of the phase windings occurs at a controlled frequency. These machines are generally referred to as synchronous reluctance machines. In a second type of reluctance machine, circuitry is provided for detecting the angular position of the rotor and energizing the phase windings as a function of the rotor's position. This second type of reluctance machine is generally known as a switched reluctance machine. The present invention is applicable to switched reluctance machines.

The general theory of design and operation of switched reluctance machines is well known and discussed, for example in *The Characteristics, Design and Applications of Switched Reluctance Motors and Drives*, by Stephenson and Blake and presented at the PCIM '93 Conference and Exhibition at Nürenberg, Germany, Jun. 21–24, 1993.

FIG. 1 illustrates an exemplary switched reluctance machine having a stator 10 including six projecting stator poles 11–16 that define a principal stator axis (extending outwardly from FIG. 1). A rotor 18 is coupled to a rotatable shaft co-axial with the principal axis of the stator. In FIG. 1, the rotor is positioned within the bore formed by the stator and the inwardly pointing stator poles 11–16 and is mounted on a shaft (not shown) that is mounted on bearings and is free to rotate. The rotor 18 has a number of outwardly extending projections 19 which form the rotor poles.

Associated with each stator pole is a wound coil of wire 17. In the illustrated machine, the two coils of opposing stator poles are coupled together to form three phases: phase A (coils from poles 11 and 14); phase B (coils from poles 12 and 15); and phase C (coils from poles 13 and 16). In the example illustrated in FIG. 1, when phase A is energized, electric current will flow through its coils such that stator pole 11 becomes, for example, an inward-pointing electromagnet of positive polarity and stator pole 14 becomes an inward-pointing electromagnet of negative polarity. These electromagnets will produce a force of attraction between the energized stator poles and the rotor poles which will produce a torque. This torque is periodic with angle and the rotational interval over which this period extends is known as the "phase period". By switching energization from one phase to another, the desired torque may be maintained regardless of the angular position of the rotor. By switching the energization of the phase windings within the phase period to develop positive torque, the machine may be operated as a motor; by energization of the phase windings within the phase period to develop a retarding torque, the machine may be operated as a brake or generator.

For the sake of illustration, a simple form of machine having six stator poles and two rotor poles (i.e. a 6/2 machine) is shown. Those skilled in the art will recognize that other combinations are possible. The present invention applies equally to such machines. Moreover, the present invention is applicable to inverted machines, where the stator is positioned within the bore of an outer rotating rotor, and to linear machines, where the rotor moves linearly with respect to the stator.

When a switched reluctance machine is running, the torque (and other machine performance parameters) may be adjusted by monitoring the rotor's position, energizing one or more phase windings when the rotor i s at a first angular position, referred to as the "turn-on angle, " and then de-energizing the energized windings when the rotor rotates to a second angular position, referred to as the "turnoff angle." The angular distance between the turn-on angle and the turnoff angle is known as the "conduction angle."

Although chopping and pulse width modulation control schemes may be used at relatively low rotor speeds, as the angular speed of the motor increases, a point is reached where there is insufficient time for more than a single pulse to occur during each phase period. At these speeds pulse width modulation or chopping strategies are ineffective, and the torque of the motor is commonly controlled by controlling the position and duration of the voltage pulse applied to the winding during the phase period. Because a single pulse of voltage is applied during each phase period, this form of control is referred to as "single-pulse control."

FIG. 2 illustrates an exemplary current waveform for a phase current in a switched reluctance motor operating in the single-pulse mode. In the single-pulse mode, the torque level is defined by the magnitude and shape of the current pulse which, in turn, is generally determined by: the angular speed of the rotor; the point during the rotor's rotation when voltage is applied to the phase winding (i.e., the turn-on angle); the point during the rotor's rotation when the application of positive voltage to the winding is halted (the turn-off angle); and, the magnitude of the voltage applied to the phase winding . FIG. 2 generally illustrates the approximate positions of the turn-on and turn-off angles and the duration of the conduction angle for the exemplary waveform.

FIG. 3 generally illustrates power circuitry that may be used to control the energization of a phase winding in single-pulse mode. Referring to FIG. 3, a phase winding 30 is coupled to a source of DC power provided through a DC bus, comprising positive rail 31 and negative rail 32, by upper switching device 33 and lower switching device 34. Return diodes 35 and 36 are provided to provide a current path from the DC bus through the phase winding 30 when switching devices 33 and 34 are opened. As those skilled in the art will appreciate, phase winding 30 is generally energized by closing switches 33 and 34, thus coupling the phase winding to the DC bus. The reluctance machine and its associated control switching circuitry is commonly collectively referred to as a switched reluctance drive. This is the case whether the drive is arranged to run the machine as a motor or a generator.

The circuit illustrated in FIG. 3 may be used to implement single-pulse mode. When the motor is operating in the single-pulse mode, the control strategy is fairly straightforward. When the rotor reaches an angular position that corresponds to the turn-on angle, switches 33 and 34 are closed. The phase winding 30 is then coupled to the DC bus, causing an increasing magnetic flux to be established in the motor. As the magnetic flux in the machine increases, current is drawn from the DC supply through the switches 33 and 34 and through the phase winding 30. When the rotor reaches an angular position corresponding to the turn-off angle, switches 33 and 34 are opened and the current in phase winding 30 transfers from switches 33 and 34 and flows through diodes 35 and 36. Diodes 35 and 36 then apply the DC voltage appearing on the DC bus in the opposite sense, causing the magnetic flux in the machine to decrease. The above description is but one example of how the circuitry of FIG. 3 may be used to implement single-pulse control.

In the single-pulse mode of operation as known in the art, the waveform of the flux in the machine tends to be of a triangular shape because the flux waveform increases in a substantially linearly fashion over the angular period of rotation of the rotor defined from a first angular position where the phase winding is first energized (the turn-ON angle) to a second angular position where the phase winding is reversed on the rails of the DC bus (the turn-OFF angle), thus de-energizing the phase winding. At the conclusion of the first angular period, the flux in the machine abruptly begins to decrease to zero. Thereafter, the flux decreases in a substantially linear fashion, with a slope broadly similar in magnitude to that during the first angular period, until it reaches zero. In these applications of switched reluctance machines where torque and speed fall together, in single-pulse mode, as the speed (and torque) of a switched reluctance motor decreases, the angular period defined by the turn-ON and turn-OFF angles for a phase winding also decreases. Accordingly, at relatively low speeds and low torques, the flux waveform for a given phase winding tends to take the form of a series of narrow triangular pulses as is illustrated in FIG. 4.

It is known at such relatively low rotational speeds to introduce a slight amount of freewheeling after the turn-OFF angle to reduce peak current or to reduce acoustic noise, as discussed, e.g., in PCT/W094/28618. This could be achieved with the circuit of FIG. 3 by, for example, opening switch 33 and allowing the current to circulate around the loop formed by phase winding 30, switch 34 and diode 36. There is no externally applied voltage in this loop, so the flux associated with the phase winding 30 remains virtually constant. This is generally illustrated in FIG. 5, where a relatively short freewheeling period is introduced after the switch-off points for each phase energization. The freewheeling periods introduced to reduce peak current are relatively short in relation to the overall rotational period defined by the flux waveform. In typical known systems, these relatively short freewheeling periods during relatively low speed operation are of the order of 10% of the rotational period over which the phase winding is coupled to the source of DC power.

It is also known in the art that the freewheeling can be effected by alternately using switch 34 and diode 36 for one or more freewheeling periods and then using switch 33 and diode 35 for a further one or more freewheeling periods. This is normally done to equalize the thermal duty of the switches and/or diodes. Since flux and current associated with the winding are insensitive to the devices used to achieve the freewheeling, the waveforms shown in FIG. 4 are unchanged.

It will also be apparent to those skilled in the art that the waveforms of FIGS. 4 and 5 are drawn for the idealized case of ideal switches and diodes and a winding of zero resistance. This yields the straight line transitions shown. In practice, there may be voltage drops associated with the circuit components which make second-order changes to the flux waveforms, but these have been neglected in order to clarify the discussion of the principal features. These second order features do not generally affect the system to any significant extent, either in known methods of operation or in the method according to the invention.

As those skilled in the art will appreciate, the existence of flux waveforms in a switched reluctance motor such as is illustrated in FIGS. 4 or 5 result in energy losses in the ferromagnetic stator and rotor. These losses are generally referred to as "iron losses". Iron losses are produced when the magnetic flux density of the magnetic material changes. Typically, the amount of iron loss is approximately proportional to the square of the magnitude of the flux density. Referring to FIGS. 4 or 5 it may be noted that the flux increases rapidly over a short period of time to a peak level and then decreases in a fairly rapid fashion to zero. These rapid changes over relatively short time intervals often result in significant iron-losses. Moreover, the relatively high peak flux values in the waveforms of FIGS. 4 and 5 produce iron losses.

Iron loss is not limited to low rotational speeds. At high speeds, the increased frequency of the occurrence of flux changes and high peak fluxes cause significant iron-loss. As the speed of the machine increases, the time required for the rotor to traverse the phase period decreases proportionally. This results in a narrowing of the gap between the triangular flux waveforms. The limiting case is typically taken to be the point where the flux triangles just touch. Unlike in low speed single-pulse operation where limited freewheeling is sometimes used, in relatively high speed operation freewheeling is not used. This is because in high speed applications the objective is generally to obtain maximum torque from the machine, which advocates against the use of any freewheeling which, if used, would reduce the available output. Moreover, peak current is typically not a problem at high speeds and, as such, there is no motivation for using any freewheeling in such situations.

It is an object of the present invention to reduce the iron-loss typically associated with the single-pulse mode of operation both in relatively low speed operation and in relatively high speed operation.

SUMMARY OF THE INVENTION

The present invention concerns a method of controlling a switched reluctance machine to reduce iron loss where the machine includes a rotor and a stator, the stator having at least one phase winding, the method including the steps of coupling the phase winding to a source of electric power over a first angular period of rotation of the rotor; allowing the current in the phase winding to freewheel through the phase winding over a second angular period of rotation of the rotor, wherein the second angular period of rotation follows the first angular period and reversing the phase winding on the source of electric power at the conclusion of the second angular period of rotation. At relatively low speeds the second angular period is greater than the first angular period.

BRIEF DESCRIPTION OF THE DRAWINGS

Other aspects and advantages of the present invention will become apparent upon reading the following detailed description of examples of the invention and upon reference to the drawings in which.

Similar reference characters indicate similar parts throughout the several views of the drawings.

DETAILED DESCRIPTION OF THE INVENTION

In accordance with a first method of the present invention, iron losses in switched reluctance machines operating in the single-pulse mode of operation at relatively low speed may be significantly reduced by introducing a relatively long freewheeling period shortly after the initiation of the single pulse. This is in sharp contrast to known low speed operation where a relatively limited freewheeling period is introduced, e.g., to reduce the peak currents.

Figure 4:
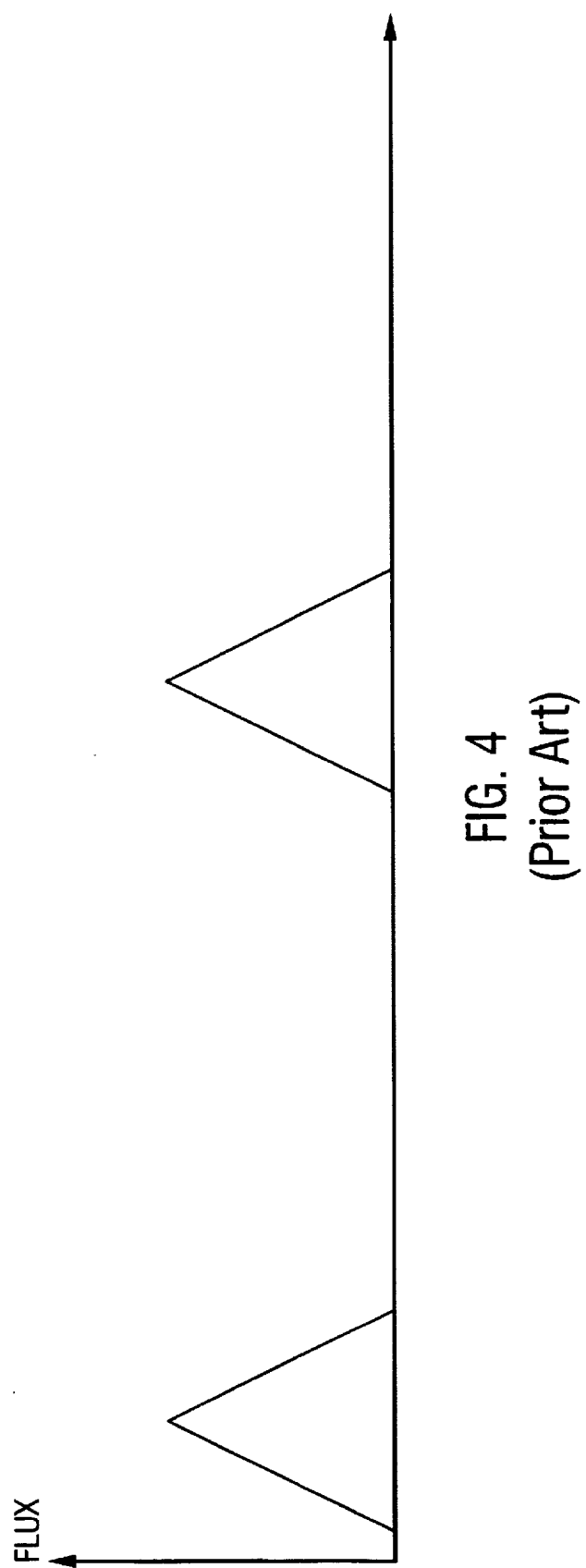
FIG. 4 illustrates a flux pattern for a switched reluctance motor operating at a low speed and with a low output torque.
Figure 5:
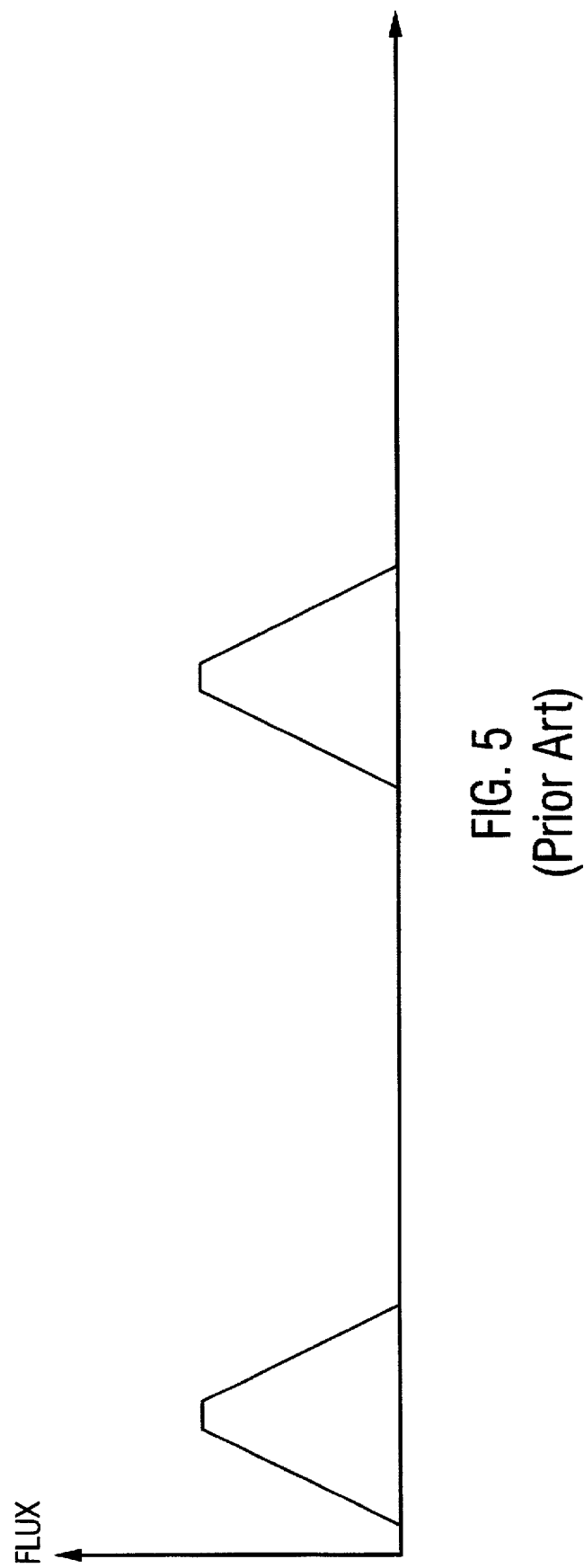
FIG. 5 illustrates a flux pattern for a switched reluctance motor operating at a low speed and with a low output torque where a limited freewheeling period is introduced after the switch-off points for each phase energization to reduce the peak current.
Figure 6:
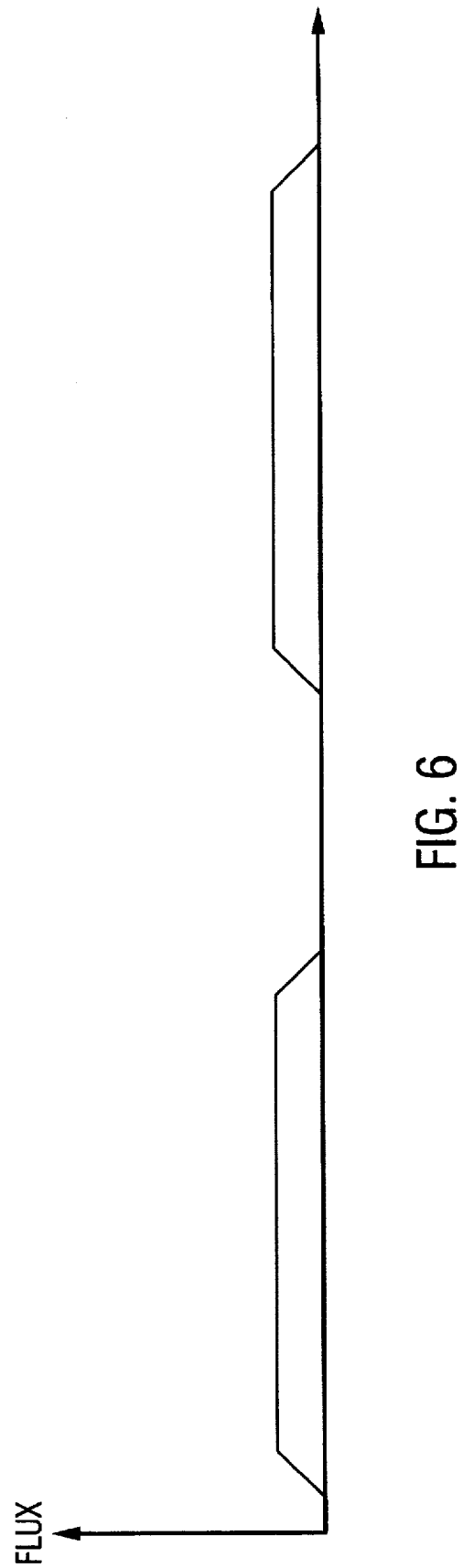
FIG. 6 generally illustrates the use of freewheeling to reduce iron loss in accordance with the present invention.

FIG. 6 generally illustrates the use of freewheeling to reduce iron loss in accordance with the present invention for a motor operating at a speed that is the same as that of the motor whose flux waveform is illustrated in FIGS. 4 and 5. As illustrated, a relatively long freewheeling period is introduced, extending from a point shortly after the phase winding is energized to a point near the end of the pulse that defines the single-pulse mode of operation. This use of a relatively long freewheeling period to reduce iron loss results in a flux waveform pattern comprising a series of rather low, wide trapezoids with a significantly lower peak flux density and, consequently, with lower iron losses. Although the amount of freewheeling will change from system to system, and from one operating point to another, freewheeling for an angular period that is greater than the angular period over which the phase winding is coupled across the DC bus will significantly reduce the amount of iron losses. For some applications, freewheeling for an angular period greater than five times the angular period over which the phase winding is coupled to the DC bus may be used. As a comparison of FIG. 4 and FIG. 6 indicates, when freewheeling to reduce iron losses is employed, the angular expanse covered by each of the trapezoidal flux waveforms is greater than that of the narrow triangular flux waveforms of FIG. 4. The peak flux density of the trapezoidal waveforms of FIG. 6, however, is significantly less than for the waveforms of FIGS. 4 or 5, resulting in a significant reduction in the iron losses. A further distinction between FIGS. 4 and 6 is that the conduction angle is significantly shorter in FIG. 6 than in FIG. 4.

Figure 7:
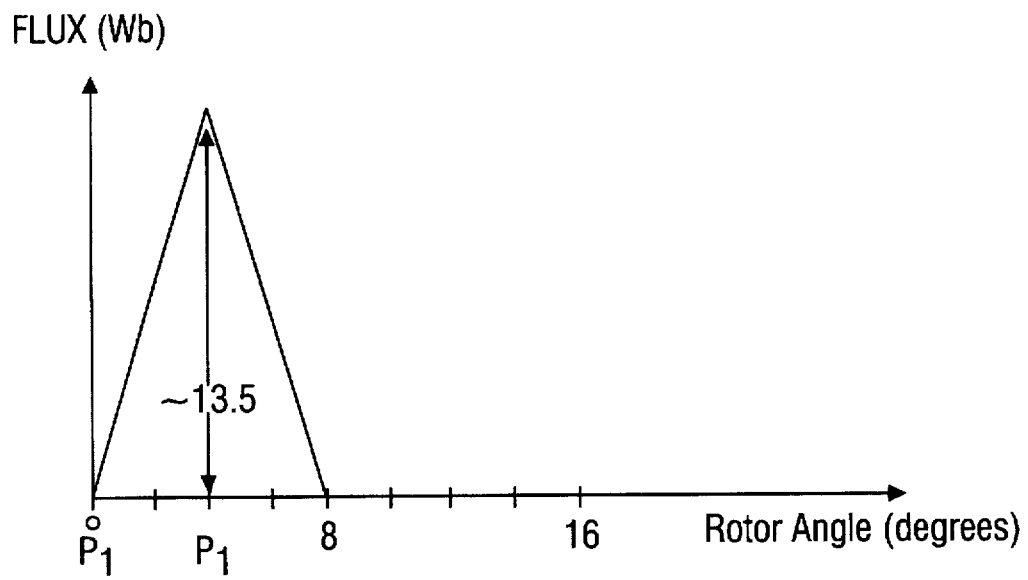
FIG. 7 generally illustrates a typical flux waveform at low speed for a switched reluctance motor operating in the single-pulse mode of operation without the introduction of freewheeling to reduce iron-loss.
Figure 8:
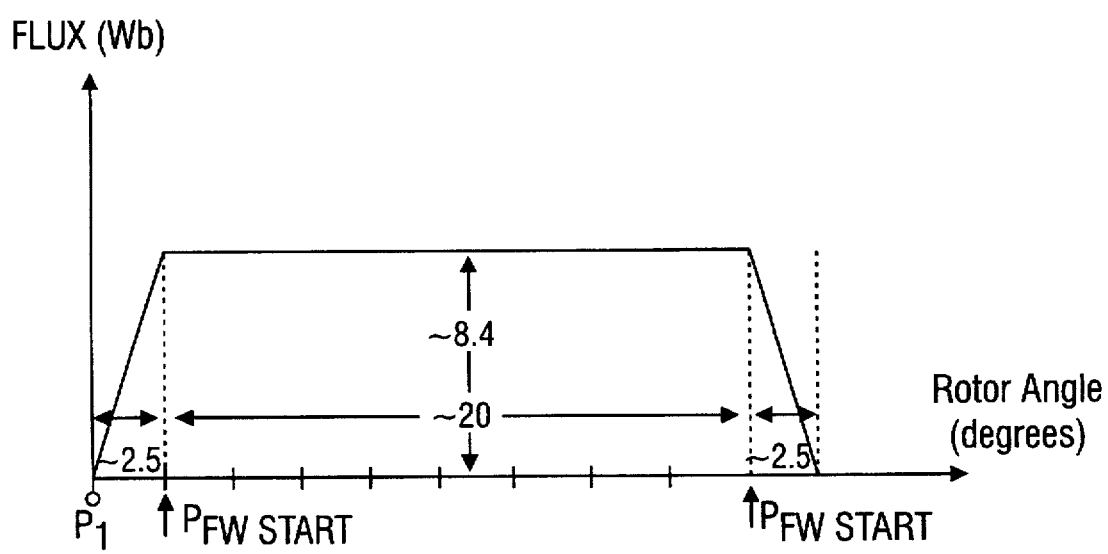
FIG. 8 generally illustrates a flux waveform for a switched reluctance motor operating at low speed in the single-pulse mode of operation when freewheeling to reduce iron-loss is introduced in accordance with the present invention.

FIGS. 7 and 8 illustrate in greater detail how freewheeling may be introduced to reduce iron loss. FIG. 7 illustrates a typical flux waveform at low speed for the single-pulse mode of operation without the introduction of freewheeling to reduce iron-loss. In the example of FIG. 7, the rotor speed is approximately 13,150 revolutions per minute and the output torque of the motor is approximately 2.517 Nm. As FIG. 7 indicates, to produce the output torque at the relatively low speed, the torque waveform is such that the angular distance between the turn-ON angle (point $P_1$) and the turn-OFF angle (point $P_2$) is only 4°. In the example of FIG. 7, the peak flux linkage is approximately $13.5 \times 10^{-3}$ WbT.

FIG. 8 illustrates the flux waveform for the same motor operating at the same speed of 13,150 revolutions per minute, when freewheeling to reduce iron-loss is introduced in accordance with the present invention. As in FIG. 7, point $P_1$ corresponds to the turn-ON angle where the phase winding is energized by switching the power devices coupled the phase winding ON, coupling the phase winding to the source of DC power. At a point early in the waveform (point $P_{FW\ start}$), the freewheeling period is initiated. In the example of FIG. 8, the freewheeling period is initiated at a point occurring 2.5° degrees of rotor rotation after the turn-ON angle. The freewheeling period in FIG. 8 is of a relatively long duration (80% of flux waveform) extending from the point corresponding to $P_{FW\ start}$ and extending over an angular period of approximately 20° until the freewheeling period is terminated at the point $P_{FW\ end}$. The flux then decays to zero over a period of approximately 2.5°. Because the angular period over which the phase winding is coupled to the source of DC power is of a relatively short duration, the peak flux linkage for the example of FIG. 8 is approximately $8.4 \times 10^{-3}$ WbT. The output torque for the flux waveforms of FIG. 8 is approximately 2.819 Nm.

As a comparison of FIG. 7 and FIG. 8 indicates, when freewheeling to reduce iron loss is introduced in accordance with this embodiment of the present invention, the peak flux density, and thus the iron loss, is significantly reduced when freewheeling in accordance with the present invention is used. Calculations of the iron loss for the two operating conditions illustrated above show that the iron loss is reduced by 24% when the freewheeling is introduced.

The specific freewheeling period and flux waveform of FIGS. 6 and 8 are provided for purposes of example only and are not intended to limit the present invention. The duration of the freewheeling period and its duration relative to the duration of the flux waveform can vary from that of FIGS. 6 and 8 without departing from the present invention. In general, the duration of the relatively long freewheeling period may be selected from an empirical analysis of the motor and the period may be optimized for lowest iron losses. In general, the freewheeling period should be greater than the angular period over which the phase winding is coupled to the source of DC power.

Figure 1:
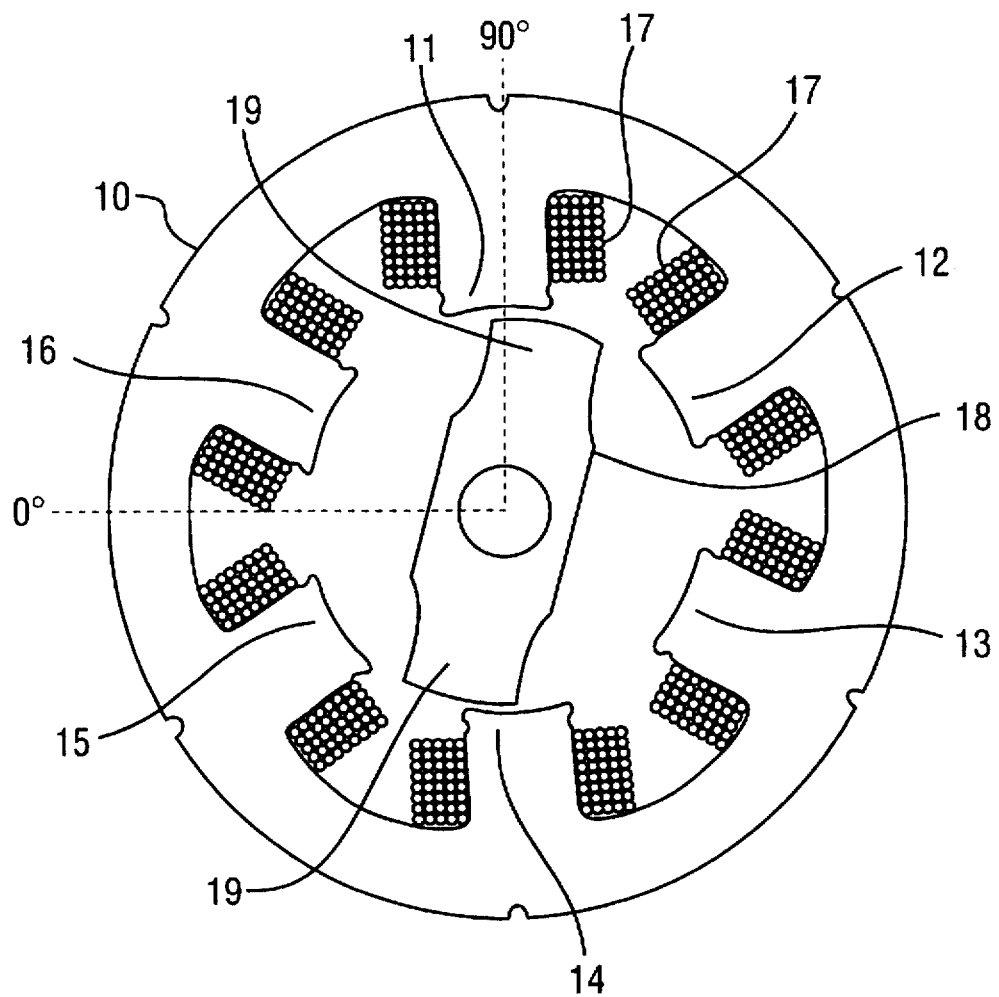
FIG. 1 illustrates an exemplary reluctance motor having a stator including six stator poles.
Figure 2:
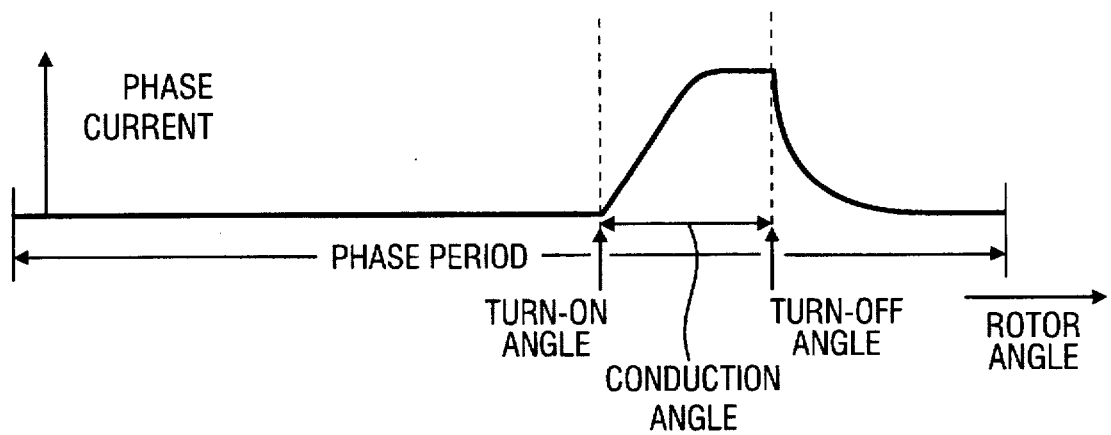
FIG. 2 generally illustrates an exemplary current waveform for a phase current in a switched reluctance motor operating in the single-pulse mode of control.
Figure 3:
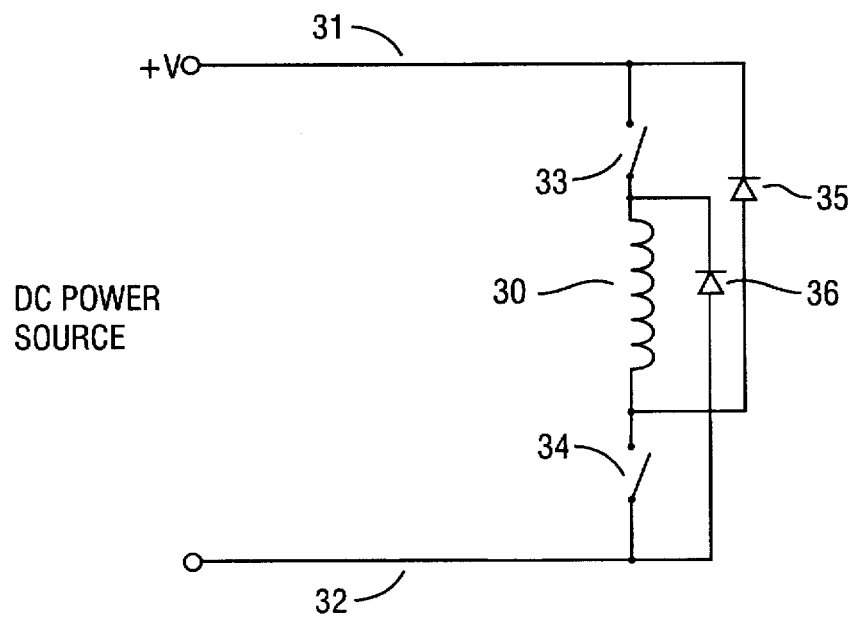
FIG. 3 generally illustrates power circuitry that may be used to control the energization of a phase winding of a switched reluctance machine for both chopping mode and single-pulse mode control.

Freewheeling to reduce iron losses may be implemented through use of the circuitry illustrated in FIG. 3. For example, the method of the present invention may be used to reduce the iron losses associated with energization of phase winding 30. At a first rotor position corresponding to the turn-ON angle both switches 33 and 34 are closed to couple phase winding 30 across the DC bus. At a second point, corresponding to a selected angular position of the rotor, one of the switching devices 33 on 34 is opened allowing the current to freewheel through the phase winding. At a third angular position of the rotor, the other switching device should be opened, de-energizing the phase winding. To reduce iron losses in accordance with the present invention, the angular period between the second and third angular positions should be greater than the angular period between the first and second angular positions.

In accordance with a second method of the present invention, iron losses in switched reluctance machines operating in the single-pulse mode of operation at relatively high speed may be significantly reduced by introducing a freewheeling period after the initiation of the single pulse. This is in sharp contrast to known high speed operation where freewheeling is not used. While the use of freewheeling in such applications reduces the available output somewhat, the overall performance of the machine may be improved because iron loss is reduced.

This method of the present invention is applicable to machines operating near the top of their speed range and is particularly applicable to machines operating at speeds such that the conduction angle (i.e. the period between the turn-ON and turn-OFF angles) would be greater than approximately 40% of the total phase period if the invention were not used.

In this second method of the present invention, a brief freewheeling period is introduced in applications where the conduction angle is greater than approximately 40% of the total phase period. This freewheeling period should be on the order of 15%–30% of the period over which the phase winding is coupled across the DC bus. In many applications 20% freewheeling period will significantly reduce the iron losses. While the use of such freewheeling at the designated high speed operation may reduce the available output somewhat, the overall performance of the machine is improved because iron loss is reduced and hence the energy conversion efficiency is improved.

The invention can be applied with particular benefit to switched reluctance drive systems where, although only low torque is required at low speed, the available cooling at low speed is also reduced. The reduction of iron loss in these circumstances enables the machine to operate satisfactorily. It can also be beneficially applied to machines which are made from electrical steel having a particularly abrupt saturation characteristic. The reduced peak flux associated with the trapezoidal wave form can reduce the losses in the winding and hence further contribute to improved efficiency.

The above description of several embodiments and methods is made by way of example and not for purposes of limitation. Many variations may be made to the embodiments and methods disclosed herein without departing from the scope and spirit of the present invention. The present invention is intended to be limited only by the spirit and scope of the following claims.

What is claimed is:

1. A method of controlling a switched reluctance machine to reduce iron loss, the machine including a rotor and a stator, the stator having at least one phase winding, the method comprising the steps of:
   energizing the phase winding over a first angular period of rotation of the rotor;
   allowing the current in the phase winding to freewheel through the phase winding over a second angular period of rotation of the rotor, wherein the second angular period of rotation follows the first angular period of rotation, and wherein the second angular period of rotation is greater than the first angular period of rotation; and
   de-energizing the phase winding at the conclusion of the second angular period of rotation.

2. The method of claim 1 wherein the first angular period of rotation is selected to control the peak flux in the machine.

3. The method of claim 1 wherein the second angular period of rotation is greater than five times the first angular period of rotation.

4. The method of claim 1 wherein the first and second angular periods of rotation are controlled such that the waveform of the flux in the machine over the interval defined by the first and second angular periods of rotation is substantially trapezoidal.

5. The method of claim 1 wherein the phase winding has first and second terminals, wherein a first switching device couples the first terminal to one rail of a DC bus, and wherein a second switching device couples the second terminal to another rail of the DC bus, and wherein the step of energizing the phase winding over a first angular period of rotation of the rotor comprises the step of closing the first and second switching devices to couple the phase winding across the DC bus when the rotor reaches a first angular position with respect to the stator.

6. The method of claim 5 wherein the step of allowing the current in the phase winding to freewheel through the phase winding over a second angular period of rotation of the rotor comprises the step of opening the first switching device when the rotor reaches a second angular position with respect to the stator.

7. The method of claim 6 wherein the step of de-energizing the phase winding at the conclusion of the second angular period of rotation comprises the step of opening the second switching device to reverse the phase winding on the DC bus.

8. The method of claim 5 wherein the step of allowing the current in the phase winding to freewheel through the phase winding over a second angular period of rotation of the rotor comprises the step of opening the first or second switching device to decouple the first or second terminal of the phase winding from the DC bus when the rotor reaches a second angular position with respect to the stator, wherein the switching device opened to initiate freewheeling alternates between the first and second switching device as the machine operates.

9. A method of controlling a switched reluctance machine in the single-pulse mode to reduce iron loss, the machine including a rotor and a stator having at least one phase winding, the method comprising the steps of:
   energizing the phase winding when the rotor reaches a first angular position with respect to the stator;
   allowing the current in the phase winding to freewheel through the phase winding when the rotor reaches a second angular position with respect to the stator; and
   de-energizing the phase winding when the rotor reaches a third angular position with respect to the stator, wherein the angular distance between the second angular position and the third angular position is greater than the angular distance between the first angular position and the second angular position.

10. The method of claim 9 wherein the angular distance between the second angular position and the third angular position is at least five times greater than the angular distance between the first angular position and the second angular position.

11. The method of claim 9 wherein the first, second and third angular positions are selected such that waveform of the flux in the machine over the interval defined by the first, second and third angular periods of rotation is substantially trapezoidal.

12. The method of claim 9 wherein the phase winding has first and second terminals, wherein a first switching device couples the first terminal to one rail of a DC bus, and wherein a second switching device couples the second terminal to another rail of the DC bus, and wherein the step of energizing the phase winding when the rotor reaches a first angular position with respect to the stator comprises the step of closing the first and second switching devices to couple the phase winding across the DC bus when the rotor reaches the first angular position.

13. The method of claim 12 wherein the step of allowing the current in the phase winding to freewheel through the phase winding when the rotor reaches a second angular position with respect to the stator comprises the step of opening the first switching device when the rotor reaches the second angular position.

14. The method of claim 13 wherein the step of de-energizing the phase winding when the rotor reaches a third angular position comprises the step of opening the second switching device when the rotor reaches the third angular position.

15. A method of controlling a switched reluctance machine to reduce iron loss, the machine including a rotor and a stator, the stator having at least one phase winding, the method comprising the steps of:

energizing the phase winding over a first angular period of rotation of the rotor that is greater than approximately 40% of the phase period;

allowing the current in the phase winding to freewheel through the phase winding over a second angular period of rotation of the rotor, wherein the second angular period of rotation follows the first angular period of rotation; and de-energizing the phase winding at the conclusion of the second angular period of rotation.

16. The method of claim 15 wherein the first angular period of rotation is selected to control the peak flux in the machine.

17. The method of claim 15 wherein the second angular period is between 15% and 30% of the first angular period.

18. The method of claim 15 wherein the phase winding has first and second terminals, wherein a first switching device couples the first terminal to one rail of a DC bus, and wherein a second switching device coupled the second terminal to another rail of the DC bus, and wherein the step of energizing the phase winding over a first angular period of rotation of the rotor comprises the step of closing the first and second switching devices to couple the phase winding across the DC bus when the rotor reaches a first angular position with respect to the stator.

19. The method of claim 18 wherein the step of allowing the current in the phase winding to freewheel through the phase winding over a second angular period of rotation of the rotor comprises the step of opening the first switching device to decouple the first terminal of the phase winding from the DC bus when the rotor reaches a second angular position with respect to the stator.

20. The method of claim 19 wherein the step of de-energizing the phase winding at the conclusion of the second angular period of rotation comprises the step of opening the second switching device to reverse the phase winding on the DC bus.

21. A method of controlling a switched reluctance machine in the single-pulse mode to reduce iron loss, the machine including a rotor and a stator having at least one phase winding, the method comprising the steps of:

energizing the phase winding when the rotor reaches a first angular position with respect to the stator;

allowing the current in the phase winding to freewheel through the phase winding when the rotor reaches a second angular position with respect to the stator; and de-energizing the phase winding when the rotor reaches a third angular position with respect to the stator, wherein the angular distance between the first angular position and the third angular position is greater than the 45% of the phase period.

22. The method of claim 21 wherein the phase winding has first and second terminals, wherein a first switching device couples the first terminal to one rail of a DC bus, and wherein a second switching device couples the second terminal to another rail of the DC bus, and wherein the step of energizing the phase winding when the rotor reaches a first angular position with respect to the stator comprises the step of closing the first and second switching devices to couple the phase winding across the DC bus when the rotor reaches the first angular position.

23. The method of claim 22 wherein the step of allowing the current in the phase winding to freewheel through the phase winding when the rotor reaches a second angular position with respect to the stator comprises the step of opening the first switching device when the rotor reaches the second angular position.

24. The method of claim 23 wherein the step of de-energizing the phase winding when the rotor reaches a third angular position comprises the step of opening the second switching device when the rotor reaches the third angular position.

* * * * *

UNITED STATES PATENT AND TRADEMARK OFFICE
CERTIFICATE OF CORRECTION

PATENT NO. : 5,760,565

DATED : June 2, 1998

INVENTOR(S) : Steven Paul Randall

It is certified that error appears in the above-identified patent and that said Letters Patent is hereby corrected as shown below:

On the title page under [56] References Cited, Foreign Patent Documents, please insert the following references therefor.

90/16111          12/27/90          WIPO

On the title page under [56] References Cited, Other Publications, please insert the following publications therefor.

Stephenson and Blake, "The Characteristics, Design And Applications Of Switched Reluctance Motors And Drives," PCIM Conference & Exhibition, June 21-24, 1993, Nuremberg, Germany.

Signed and Sealed this

Thirtieth Day of November, 1999

Attest:

Q. TODD DICKINSON

Attesting Officer

Acting Commissioner of Patents and Trademarks